United States Patent Office 3,164,627
Patented Jan. 5, 1965

3,164,627
METHOD FOR PREPARING UNSATURATED ALIPHATIC NITRILES
Saburo Minekawa, Shohei Hoshino, Atsushi Shibata, and Naoya Kominami, all of Tokyo, Japan, assignors to Asahi Kasei Kogyo Kabushiki Kaisha, Osaka, Japan a corporation of Japan
No Drawing. Filed Sept. 7, 1960, Ser. No. 54,380
Claims priority, application Japan, Mar. 9, 1960, 35/7258
7 Claims. (Cl. 260—465.3)

The present invention relates to a method for preparing unsaturated aliphatic nitriles by a gaseous reaction, on a catalyst, of aliphatic $\alpha,\beta$-unsaturated hydrocarbons, ammonia and air or molecular oxygen, in one step.

Various attempts have been made to prepare, in one step, unsaturated nitriles by a gaseous catalytic reaction of olefins and ammonia; olefins, ammonia and air; or olefins, ammonia and molecular oxygen. However, these attempts have not produced unsaturated nitriles but only saturated nitriles such as acetonitrile, propionitrile and the like. If any unsaturated nitrile was produced, it was very little. The only way found to produce such unsaturated nitriles was through intermediates such as acrolein, allylamine and the like. Recently, such a process using bismuth phosphomolybdate as a catalyst was stated to be commercially successful.

We have now found that tellurium oxide is an effective catalyst for commercial production of unsaturated nitriles from a gaseous mixture of $\alpha,\beta$-unsaturated aliphatic hydrocarbons, ammonia and air or molecular oxygen. According to the present invention, such unsaturated nitriles are produced by contacting the gaseous mixture with a catalyst consisting of tellurium oxide which may be carried on such solid carriers as alumina, silica, mixtures thereof, pumice, diatomaceous earth, kaoline, bentonite, etc. We have also found that metallic tellurium behaves the same as its oxide under the present conditions. It is desirable but not necessary to add to the catalyst a small amount of phosphoric acid or alkali metal salts, e.g. not more than 10% by weight of tellurium, to inhibit byproduction of hydrogen cyanide and/or carbon dioxide gas. When a natural material is used as the carrier, it is further desirable to preheat the material at a temperature above 1000° C. For instance, natural kaoline may be heated at a temperature of 1000°–1500° C. for 4 hours or more. Undesirable side-reactions and increase in production of carbon dioxide and/or hydrogen cyanide occur when the catalytic surface area is very large. The surface area of the catalyst depends upon the properties of the carrier, but, in general, will not have to be more than 500 m.²/g., preferably 10–200 m.²/g. The present catalyst may be prepared by any of the conventional methods. For example, preheated carrier materials may be thoroughly commingled with tellurium oxide and molded into grains, or grain carrier materials may be immersed in a solution of tellurium oxide in hydrochloric acid, concentrated and then baked at higher temperature.

The composition of the gaseous mixture consisting of $\alpha,\beta$-unsaturated aliphatic hydrocarbons, ammonia and air or molecular oxygen may be varied in a wide range, but preferably the olefin concentration is about 10% by weight. When the olefin concentration is less than 10%, the higher the concentration, the better. The mole ratio of ammonia to olefin is, preferably, 1.0–2.0, and a ratio of more than 2.0 does not increase conversion and, therefore, is not advantageous from an economical point of view. Pressure in the reaction system may be atmospheric or slightly above. It is desirable for improvement of selectivity of the catalyst and conversion to introduce steam into the reaction system. Diluent gases such as nitrogen, propane, carbon dioxide and the like which are inactive under the present reaction conditions may be introduced, as in other gaseous phase oxidation reactions. The temperature may be 300°–480° C., preferably 350°–450° C. Contacting time may be 0.2–20 seconds, and preferably 5–12 seconds. Any apparatus for a gaseous phase reaction may be employed. The catalyst bed may either be fixed or fluidized.

Example 1

Water was added to a mixture of 80 gr. of silica gel powder (less than 300 mesh) and 20 gr. of tellurium oxide, and the product was kneaded for a long time to form a paste and molded into grains of 6–10 mesh. After being dried, the grains were baked at 400° C. for 4 hours, by means of a stream of air. 20 cc. of the catalyst thus obtained were diluted with quartz pieces to a proper concentration in a Terex glass tube until the tube was filled. The tube was dipped in a niter bath maintained at 400° C. A mixture of 8.0% by volume of propylene, 8.0% by volume of ammonia and 84% by volume of air was introduced at a rate of 133 cc./min. The same procedure was also effected in a niter bath at 380° C. Reaction products were analyzed by gas chromatography.

|  | Conversion (mol percent) | | Yield to consumed propylene (mol percent) | |
|---|---|---|---|---|
| Niter bath, ° C | 400 | 380 | 400 | 380 |
| Acrylonitrile | 23.1 | 14.5 | 41.3 | 39.2 |
| Acetonitrile | 6.8 | 7.0 | 13.1 | 18.9 |
| Carbon dioxide | 10.5 | 7.2 | 20.2 | 19.4 |
| Hydrogen cyanide | 7.5 | 5.4 | 14.4 | 14.6 |
| Carbon monoxide and others | 4.2 | 3.0 | 8.0 | 8.1 |

Example 2

The same procedure was repeated using a gaseous mixture consisting of 5.0% by volume of propylene, 5.0% by volume of ammonia and 90% by volume of air.

|  | Conversion (mol percent) | | Yield to consumed propylene (mol percent) | |
|---|---|---|---|---|
| Niter bath, ° C | 400 | 380 | 400 | 380 |
| Acrylonitrile | 21.8 | 15.0 | 41.3 | 35.0 |
| Acetonitrile | 6.4 | 6.5 | 12.1 | 15.2 |
| Carbon dioxide | 15.3 | 12.6 | 29.0 | 29.4 |
| Hydrogen cyanide | 6.3 | 6.2 | 11.9 | 14.5 |
| Carbon monoxide and others | 3.0 | 2.5 | 5.7 | 5.8 |

Example 3

The catalyst of Example 1 was placed in an aqueous phosphoric acid solution to absorb 0.0034 gr. per cc. of the catalyst of phosphoric acid. After being dried, baked at 400° C. for 4 hours, the catalyst was placed in a reaction tube. The tube was dipped in a niter bath of 415° C. and then a gaseous mixture consisting of 8.0% by volume of propylene, 8.2% by volume of ammonia and 83.8% by volume of air, was introduced therein at a rate of 133 cc. per min. accompanied with steam at a rate of 27 cc. per min.

|  | Conversion (mol percent) | Yield to consumed propylene (mol percent) |
|---|---|---|
| Acrylonitrile | 31.0 | 54.0 |
| Acetonitrile | 7.1 | 12.4 |
| Carbon dioxide | 12.8 | 22.3 |
| Hydrogen cyanide | 4.0 | 7.0 |
| Carbon monoxide and others | 2.5 | 4.4 |

Example 4

Silica gel grains (8–10 mesh) were baked at 1100° C. for 4 hours, 100 gr. of the baked product were placed in a solution of 10 gr. of tellurium oxide dissolved in 150 cc. of a 25% hydrochloric acid solution, which was concentrated being suspended, and dried to dryness. The product was baked at 400° C. for 10 hours completely removing hydrogen chloride gas by means of a stream of air. 20 cc. of the catalyst thus obtained was placed in a Terex glass tube and dipped in a niter bath of 400° C. A gaseous mixture of 8.0% by volume of propylene, 8.2% by volume of ammonia and 83.8% by volume of air was introduced at a rate of 133 cc. per min. After the reaction reached equilibrium, a sample was analyzed.

|  | Conversion (mol percent) | Yield to consumed propylene (mol percent) |
|---|---|---|
| Acrylonitrile | 26.0 | 55.4 |
| Acetonitrile | 5.2 | 11.1 |
| Carbon dioxide | 7.8 | 16.6 |
| Hydrogen cyanide | 4.9 | 10.5 |
| Carbon monoxide and others | 3.0 | 6.4 |

Example 5

The same procedure as Example 4 was repeated using isobutylene in place of propylene.

|  | Conversion (mol percent) | Yield to consumed isobutylene (mol percent) |
|---|---|---|
| Methacrylonitrile | 15.8 | 48.2 |
| Acetonitrile | 2.7 | 8.2 |
| Carbon dioxide | 7.0 | 21.4 |
| Hydrogen cyanide | 4.0 | 12.2 |
| Carbon monoxide and others | 3.3 | 10.0 |

What we claim is:

1. A one-step catalytic process for making olefinic nitrile which consists essentially of contacting (a) a gaseous mixture of ammonia, molecular oxygen and unsaturated olefin selected from the group consisting of propylene and isobutylene with (b) catalyst which consists of tellurium oxide, said ammonia and olefin being in a molar ratio of from 1:1 to 1:2, and said molecular oxygen in the mixture being the equivalent of about 83.8 to 90% by volume of air.

2. A one-step catalytic process for making acrylonitrile which consists essentially of contacting (a) a gaseous mixture of ammonia, molecular oxygen and propylene with (b) catalyst which consists of tellurium oxide, said ammonia and propylene being in a molar ratio of from 1:1 to 1:2, and said molecular oxygen in the mixture being equivalent of about 83.8 to 90% by volume of air.

3. A one-step catalytic process for making methacrylonitrile which consists essentially of contacting (a) a gaseous mixture of ammonia, molecular oxygen and isobutylene with (b) catalyst which consist of tellurium oxide, said ammonia and isobutylene being in a molar ratio of from 1:1 to 1:2, and said molecular oxygen in the mixture being equivalent of about 83.8 to 90% by volume of air.

4. A one-step catalytic process for making olefinic nitrile which consists essentially of contacting (a) a gaseous mixture of ammonia, molecular oxygen and unsaturated olefin selected from the group consisting of propylene and isobutylene with (b) catalyst which consists of tellurium oxide and metallic tellurium, said ammonia and olefin being in a molar ratio of from 1:1 to 1:2, and said molecular oxygen in the mixture being the equivalent of about 83.8 to 90% by volume of air.

5. A one-step catalytic process for making olefinic nitrile which consists essentially of contacting (a) a gaseous mixture of ammonia, molecular oxygen and unsaturated olefin selected from the group consisting of propylene and isobutylene with (b) catalyst which consists of tellurium oxide and an inorganic phosphoric acid, the inorganic phosphoric acid constituting at most 10% by weight of tellurium in the catalyst, said ammonia and olefin being in a molar ratio of from 1:1 to 1:2, and said molecular oxygen in the mixture being the equivalent of about 83.8 to 90% by volume of air.

6. A one-step catalytic process for making olefinic nitrile which consists essentially of contacting at a temperature of from 300° to 480° C. (a) mixture of ammonia, molecular oxygen and unsaturated olefin selected from the group consisting of propylene and isobutylene with (b) catalyst which consists of tellurium oxide, the catalyst being carried on a solid carrier, said ammonia and olefin being in a molar ratio of from 1:1 to 1:2, and said molecular oxygen in the mixture being the equivalent of about 83.8 to 90% by volume of air.

7. A one-step catalytic process for making olefinic nitrile which consists essentially of contacting at a temperature of from 300° to 480° C. (a) a mixture of ammonia, molecular oxygen and unsaturated olefin selected from the group consisting of propylene and isobutylene with (b) catalyst which consists of tellurium oxide and phosphoric acid, the phosphoric acid constituting at most 10% by weight of tellurium in the catalyst, the catalyst being carried on a solid carrier, said ammonia and olefin being in a molar ratio of from 1:1 to 1:2, and said molecular oxygen in the mixture being the equivalent of about 83.8 to 90% by volume of air.

References Cited in the file of this patent

UNITED STATES PATENTS

| 2,481,826 | Cosby | Sept. 13, 1949 |
| 2,904,580 | Idol | Sept. 15, 1959 |
| 3,009,943 | Hadley | Nov. 21, 1961 |

OTHER REFERENCES

Bergmann: "The Chemistry of Acetylene and Related Compounds," 1948, p. 80.